(12) United States Patent
Debrot et al.

(10) Patent No.: US 8,533,218 B2
(45) Date of Patent: Sep. 10, 2013

(54) DEBUGGING SYSTEM FOR MULTIDIMENSIONAL DATABASE QUERY EXPRESSIONS ON A PROCESSING SERVER

(76) Inventors: David Alvarez Debrot, Zug (CH); Marc Polizzi, Morges (CH)

( * ) Notice: Subject to any disclaimer, the term of this patent is extended or adjusted under 35 U.S.C. 154(b) by 319 days.

(21) Appl. No.: 12/913,153

(22) Filed: Oct. 27, 2010

(65) Prior Publication Data
US 2012/0109878 A1    May 3, 2012

(51) Int. Cl.
*G06F 7/00*    (2006.01)
(52) U.S. Cl.
USPC ............ 707/769; 707/602; 707/774; 707/778
(58) Field of Classification Search
USPC .................................. 707/602, 769, 774, 778
See application file for complete search history.

(56) References Cited

U.S. PATENT DOCUMENTS

| | | | |
|---|---|---|---|
| 6,750,864 B1 | 6/2004 | Anwar | |
| 7,694,278 B2 | 4/2010 | Pasumansky | |
| 7,716,253 B2 | 5/2010 | Netz | |
| 2005/0120051 A1 | 6/2005 | Danner | |
| 2006/0020921 A1* | 1/2006 | Pasumansky et al. | 717/124 |
| 2007/0061344 A1 | 3/2007 | Dickerman | |
| 2010/0017395 A1* | 1/2010 | Wayn et al. | 707/5 |

* cited by examiner

*Primary Examiner* — Cindy Nguyen (57) ABSTRACT

The present invention relates to data processing systems and methods to facilitate debugging, development and execution of multidimensional database queries, such as MDX (Multi-Dimensional eXpressions), for a multidimensional database structure on a computer architecture running on a server, such as an OnLine Analytical Processing Server (OLAP). The expression or query can be broken down and executed incrementally and associated with contextual information which can be viewed by an end-user via an understandable user interface. The advantage is the drastic simplification of very complex computations, giving the user a perspective not available till now. This allows users to better understand multidimensional queries, find errors that occur in the execution and correct such errors.

18 Claims, 9 Drawing Sheets

MDX debugging/profiler system : main components

FIGURE 1

MDX debugging/profiler system : main components

Internal/intermediate execution states of the MDX query : linked to the MDX query

FIGURE 4

Internal/intermediate execution states of the MDX query: linked to the MDX result

DEBUGGING SYSTEM FOR MULTIDIMENSIONAL DATABASE QUERY EXPRESSIONS ON A PROCESSING SERVER

BACKGROUND OF THE INVENTION

1. Field of the Invention

This invention relates to systems and methods for developing and debugging multidimensional queries or request instructions on a multidimensional database, and providing a front end user interface to such multidimensional queries on a multidimensional database implemented on an electronic processor unit or computational hardware, in order to better understand, troubleshoot and build on these multidimensional queries as well as the multidimensional database. More particularly, this invention relates to systems and methods implemented on an electronic processing unit in facilitating the display to a user of multidimensional queries and data in a number of different user-friendly, human-understandable formats to improve the end user's comprehension of very complex and exhaustive data and relationships, in a such a way as to first understand small segments or increments of query execution, allowing the user to correct errors in execution, tune queries and produce desired results.

2. Description of the Related Art

Several patents presently deal with structures and architectures for storing multidimensional databases. A few even approach debugging the state of a multidimensional database during execution. Several of these patents and applications are disclosed and incorporated as references herein. However, no present applications or disclosures deal with the actual run-time interactive debugging of segments or parts of the actual multidimensional queries. Thus, there remains an acute need in the field for systems allowing the end-user, even at a novice level to be able to view and troubleshoot execution at the atomic level, in an easily understandable format.

Multidimensional queries are presently the new paradigm used in complex computations applied to several real-world problems from banking to geographic and medical imaging, as well as to modeling and simulation. A multidimensional database is typically organized, optimized and structured in a way to allow/speed-up queries against OLAP cubes; with their dimensions, levels, and hierarchies, these are exemplary of multidimensional database "structures". Dimensions, hierarchies and levels define MDX and multidimensional query languages in a similar way to which tables and columns are central to SQL or relational database languages. They serve to map business models into language-specific concepts (e.g. a list of countries may be mapped as a single dimension in MDX). Multidimensional query result sets may be quite complex, each possibly spanning 10 pages or more. With the presently available tools, it is either exhaustive, or sometimes entirely impossible, for an end user or developer to test his or her query on a dataset and to understand how a particular result was generated, since it is likely to be the net result of several important intermediate operations, none of which is directly related to the result. The user would need to then go back and manually decompose a query into smaller parts, running each one separately; this process is not only unreliable and error prone but also extremely time-consuming. For the most complicated requests, such a practice might not even be possible due to the very nature of multidimensional query languages, and the difficulty of even visualizing inputs and results beyond three dimensions, let alone working through them. A system is thus required to work through these nodes of complexity where multiple dimensions are present in both the query and the resultant set. Erroneous or misleading outputs require users to backtrack and work through various layers of a query, requiring a snapshot of each execution node and indeed each intermediate execution step. Thus function calls, expected and actual results, must be traced and compared, so the user can backtrack, manipulate or correct the query, or even the input data set.

Debuggers have become commonplace in computer technology and software development, so that errors in execution may be traced, or input values can be modified to yield correct/expected results. However, over the last years, computing complexity has greatly increased and a need has developed for a method to debug multidimensional, multi-level computing problems with simplicity and ease, without simultaneously creating an information overload and hence confusion for the user. The need has also arisen to be able to simultaneously trace resultant values at various stages or nodes of execution, for example in parallel processing and computation.

SUMMARY OF THE INVENTION

The present application concerns a debugging system that facilitates understanding of behind-the-scenes operation of a multidimensional query engine on multidimensional queries onto a multidimensional database. This debugger is an invaluable tool in creating sophisticated database reports. Multidimensional queries are inherently powerful in analyzing data and generating such reports; but have a trade-off of complexity and a steep learning curve. The present invention dramatically minimizes both of these factors.

The system provides a multidimensional conceptual view of the data, including full support for hierarchies and multiple hierarchies, which is in itself the most logical way to analyze real-world business entities and organizations. Note that there are no upward or downward limits on the number of dimensions to be handled, since this is too application/implementation dependent, and in fact most commercial products are equipped with a sufficient dimensionality for their target markets. Where OLAP cubes are used in examples, they are merely illustrative examples of multidimensional structures. There is also no specific underlying database technology used, as long as the user is provided with a truly multidimensional conceptual view.

The debugger rapidly shortens the learning curve of a beginner or intermediate multidimensional database developer or programmer, while exponentially increasing productivity. The system obviates a need to conceptualize or estimate efficiency and processing steps of a given query, as these are directly visible on screen. Precise metrics and optimization of multidimensional queries are possible for even a novice developer! The system also eliminates the need for a user to backtrack and trace the execution of various constituent atomic segments of a query, the problem mentioned above, thus greatly simplifying an extremely exhaustive task.

DETAILED DESCRIPTION

The present invention offers an innovative way of understanding multidimensional queries on a multidimensional database. Multidimensional queries, e.g. in MDX (Multi-Dimensional eXpression) language are normally processed by an OnLine Analytical Processing (OLAP) server and engine which may as an example, return the results in the form of a Pivot Table, or other such tabular or graphical representation. However, though MDX is a de-facto standard for multidimensional query languages, its specification is somewhat incomplete and ambiguous.

It requires years of experience and expertise in the field to predict the results of complex multidimensional queries (MDX or other) with any degree of certainty, as they depend on the specifics of the OLAP server in use.

The present invention allows an end user to understand exactly how a multidimensional query is actually transformed (processed and analyzed) to produce a given result. This drastically cuts the time required to implement and tune a multidimensional query. The present invention therefore represents an important step toward the wide adoption of multidimensional query languages such as MDX. It is also suitable for educational purposes, providing a unique way to understand multidimensional query languages, hence sharply reducing the learning curve.

The debugger shows an end user how a request has been parsed and executed by the OLAP kernel, decomposing MDX queries into a tree-like structure of MDX parts. Each MDX part has a list of parameters and a return value. The invention consists of showing how multidimensional queries are transformed and processed prior to execution on the server (such as an OLAP server): The process entails the following steps:
1. Initially creating a segment of a multidimensional query (referred to for simplicity as an 'MDX Part'), and extracting information associated with the MDX Part ('MDX Part Info').
2. Next, linking the MDX Part and the MDX Part Information to the corresponding multidimensional (here MDX) Query as well as the Result (MDX Result).
3. Displaying this linked information for each segment or node of the query to the end-user in different human-understandable formats. Any suitable format may be used here.

Data Model

Dimensions, attributes, hierarchies and levels are the way that a business model may be defined in MDX. They represent a meta-definition of the data, similar to tables and columns in relational databases. Dimensions represent major business concepts and are a generalization of concrete entities (Geography, Time or Products). Attributes are used to store relevant details on each dimension. As an example, Color, Category, Sub-Category, Price and Size are attributes used to capture details of the dimension Product. Similarly, Date, Month, Year, Hour, Minute, and Seconds are attributes used to capture details of the dimension Time.

Attributes relate to one another, in a way that a day has 24 hours, an hour 60 minutes and a minute 60 seconds. When attributes are arranged or organized in such a way as to represent their relationships to one another, this arrangement is considered a hierarchy. Note that the Time dimension in the above example of a hierarchy is merely illustrative but not exclusive. Under Geography, continents have countries, which in turn have states, which in turn have cities. Therefore a key task of dimension modeling is to identify needed attributes so as to fully capture the data related to a dimension and how those attributes relate to one another. Dimensions need not be limited to a single hierarchy. In common business problems, they may actually contain many hierarchies.

Consider a report displaying geographical as well as economic properties of Countries, as defined by two distinct hierarchies (i.e. geographic and economic) within a dimension. For a geographical hierarchy, [Geography], continents, countries and cities are properties. This directly lays out three levels of our hierarchy [Continent], [Country] and [City]. For an economic hierarchy, [Economy], we want to see the economic partnerships (EU, NAFTA) and countries, which defines two levels of our hierarchy [Partnership], [Country]. It can be seen that both hierarchies do not need to have the same depth (number) of levels. Nor need they share the same level attributes. In our example, we could have the economic hierarchy without a 'Country' level and/or have two the same Country in two distinct economic partnerships.

Therefore, in MDX syntax, we will represent the structure defined before:

```
Dimension
    [Geography]
Hierarchy
    [Geography].[Geo] and [Geography].[Economy]
Levels
    [Geography].[Geo].[Continent],
    [Geography].[Geo].[Country],
    [Geography].[Geo].[City],
    [Geography].[Economy].[Partnership],
    [Geography].[Economy].[Country]
```

A brief example to visualize a hierarchy is as follows:

```
World
    America
        US
            New York
            LA
    Europe
        Spain
    ....
```

Therefore results (e.g. sales quantities) may be verified for America as the highest geographical unit, then if needed drilled down to even the cities, such as New York, for more minute details.

Architecture

Figure 1:
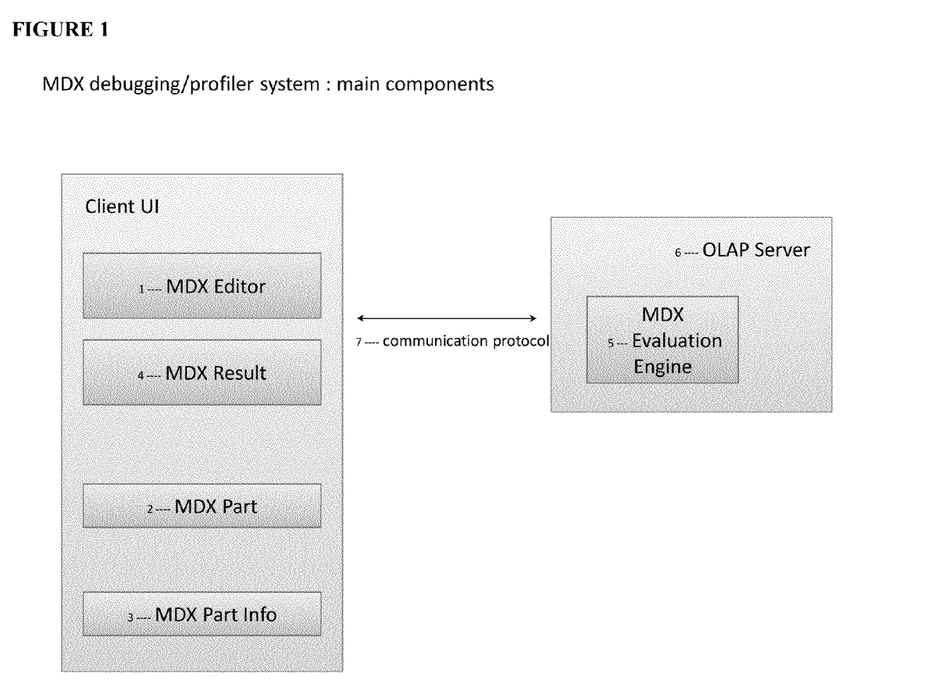
FIG. 1 is an Architectural Overview of the Present Invention.

FIG. 1 shows the conceptual architecture of the present invention, specifically the various components of the debugging system for multidimensional database queries entered by a user and executed on the database. The rendition assumes a query in the MDX language using the XMLA standard and running on an OLAP server. It is important to keep in mind, however. that these limitations are not imposed on the current system and it can be deployed on any suitable multidimensional query language running on an appropriate server and engine. Though MDX is standardized within XMLA as the main language presently used to query multidimensional databases, any appropriate multidimensional query language may be substituted.

The MDX Editor, 1, is the user interface that facilitates user-comprehension of the multidimensional query or request, breaking down the queries into segments entitled 'MDX Parts', 2, which may be associated to contextual information pertinent to that particular query segment, entitled 'MDX Part Info', 3. The query segment with this information is also further associated to the result of processing the query or sub-query segment, entitled 'MDX Result', 4. It is this bundled information that is shown to the user in a human-understandable format. It is important to keep in mind that data is not tied down to any source format; it may indeed be sourced from any physical persistent system (relational databases, flat files, http streams etc.) that can provide raw data to the query engine.

Note that processing of the query occurs on the 'MDX Evaluation Engine', 5, occurring not on the user side, which may indeed be a dumb-terminal, but residing on the machine that is endowed with superior computing power, typically a server, often implemented as an 'OLAP Server', 6. The query is sent to the server and the result transmitted back to the user interface using a suitable communication protocol, 7.

Data Model and Component Definitions Using MDX

MDX Query: a standard MDX query following the language specification according to the XMLA standard, but which may also include some vendor specific functionalities (such as new functions, language and syntactical extensions).

MDX Editor: a human input-output interface allowing the end-user to enter, then execute an MDX query with the capability of showing the result in a human understandable format. The invention is not tied to any specific graphical, textual or other format, but merely assumes ready comprehension by an end-user.

MDX Result: The result of an MDX query also follows the specification laid out in the XMLA standard. As a brief, rather incomplete description, for a two dimensional MDX query the Result can be produced in the simplest form as a biaxial table or mapping, with the first axis being the columns, the second the rows, and the cells themselves representing the actual resultant values; a simple example is a sales price table per unit quantity, with the result being the prices (It is important to remember this is merely a simple illustration, and it is not intended to be construed as a limitation to the number of dimensions to be used):

|                 |   | Number of Units Sold |     |     |     |
| --------------- | - | -------------------- | --- | --- | --- |
| Products        | \| | 1                    | 2   | 3   | 4   |
| Notebooks       | \| | 1                    | .8  | .7  | .5  |
| Ball Point Pens | \| | 3                    | 2.5 | 2.1 | 1.5 |

MDX Part: The query is decomposed in segments or parts, referred to as 'MDX Parts'. MDX Parts are sub-segments of a whole MDX query and may be linked with the MDX query and with the MDX result.

- each part is linked to the original MDX query range it belongs to.
- each part is linked to the end result showing how it has contributed to it.
- each part is related to other parts at different granularity and/or different moment in time (as in a tree or graph).

'MDX Part Info', the execution value (and context) of each part, is displayed to the user.

MDX Part Info: To each MDX Part, information is added, allowing business users to understand processing of an MDX function, statement or other language operator. As example for a function Head (list)-retrieving the first element of the a list, Part Info will include information on the list (which is a parameter), and a resulting value (first member). 'MDX Part Info' can be embellished with information such as elapsed time, memory usage or vendor-specific information.

'MDX Evaluation Engine' is the multidimensional database processing engine which implements most of the logic that takes the query and suitably executes the individual query parts, the 'MDX Parts' at the atomic/segmental level and reassembles results for the end-user. MDX Editor has an interface to the segmental execution performed on the server by the 'MDX Evaluation Engine'.

Figure 2:
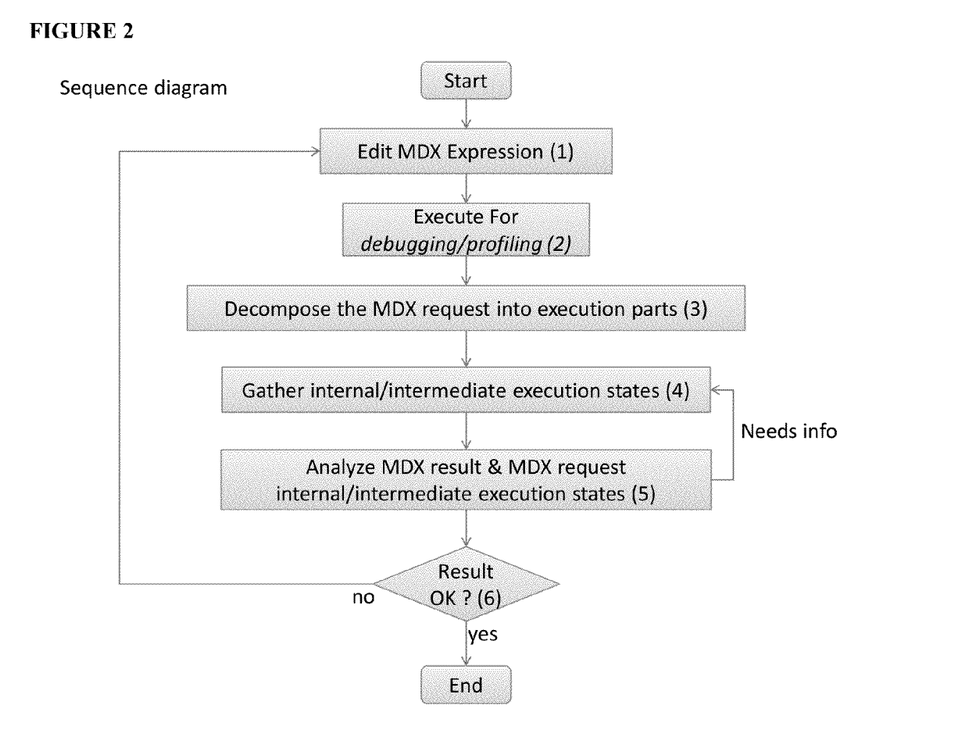
FIG. 2 is a Flow Sequence Diagram for Debugging and Profiling of a New Query Entered.

'OLAP Server' is an instance of the server or host machine used to implement a multidimensional database processing engine such as 'MDX Evaluation Engine'. The invention at hand is not implementation dependent. Therefore, the server need not be limited to an 'OLAP Server'. FIG. 2 shows the Flow Sequence Diagram for Debugging and Profiling of a new query as it is received by the system.

1. The user edits and specifies a new multidimensional (MDX) expression.
2. The user then requests execution of the query to debug, profile or to generally get more detailed information; after which the query is sent as a request to the OLAP engine.
3. On the server side, the request is decomposed into smaller execution segments or 'MDX Parts'. To each such part, the system adds pertinent information 'MDX Part Info'. These segments or 'MDX Parts' may be analyzed later by the end-user.
4. Along with the MDX request result, this information is bundled and transmitted back to the user for the purposes of analysis, utilizing any familiar communication protocol.
5. The user browses and analyzes the result and the debugging information; a graph of the various execution segments or 'MDX Parts' reveals how a request was interpreted and executed by the server; the information attached to each part assists a user to understand what actually occurred. For example, for a function call expression, additional bundled information may be the parameter values along with the result. If necessary, the user may request the server for more information as not all information is sent at once to the client side. Due to the large size of the 'MDX Part Info', there is the possibility that a call back to the server may be required in order to gather more information.
6. The user may then either modify the request and initiate a new iteration of execution, or simply end the process.

Figure 3:
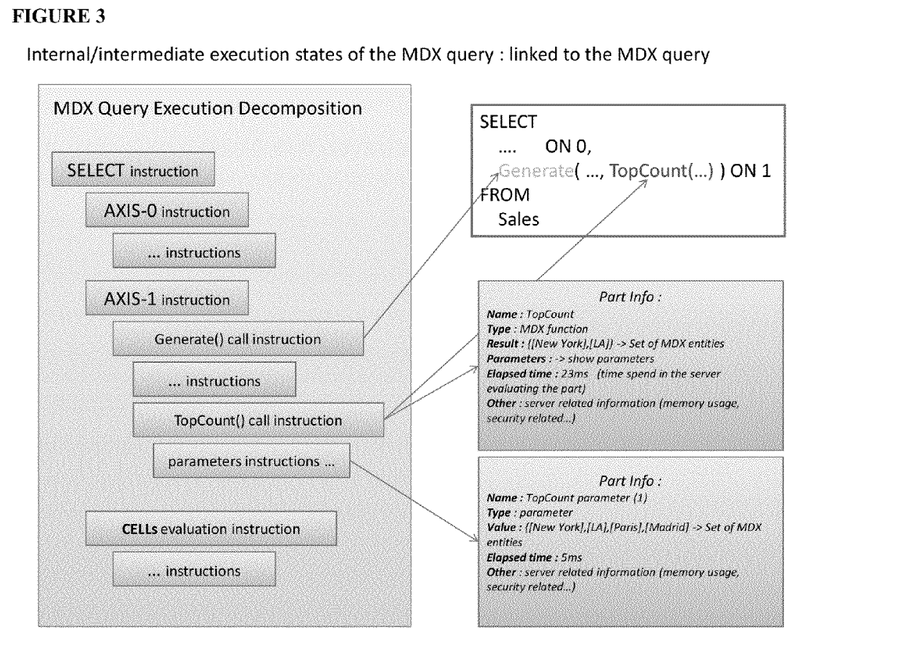
FIG. 3 is a Snapshot of Internal/Intermediate Execution States of Linked to an MDX Query.

FIG. 3 shows an example of internal and intermediate execution states of an MDX query, displayed as 'MDX Part' and 'MDX Part Info' linked to the MDX query itself. Note the additional library function calls, such as TopCount( ) and Generate( ).

Figure 4:
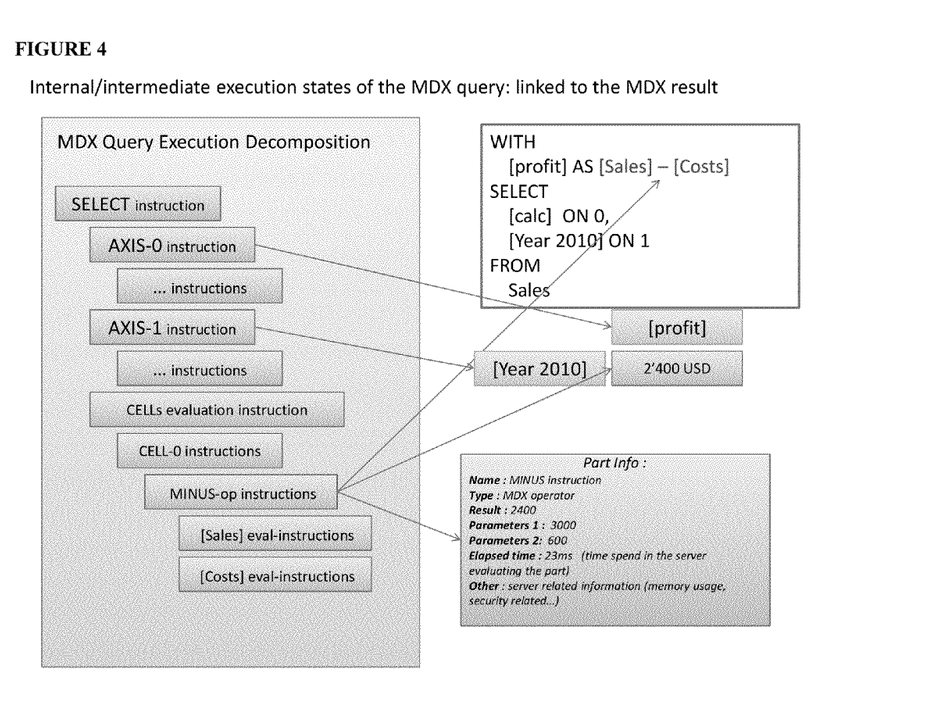
FIG. 4 is a Snapshot of Internal/Intermediate Execution States of Linked to an MDX Result.

FIG. 4 shows an example of internal and intermediate execution states of an MDX query, displayed as 'MDX Part' and 'MDX Part Info' linked to the MDX query.

The advantage of the invention at hand is in the conciseness of information to which an end user is exposed. Moreover, information shown to an end-user is platform and vendor independent, as it does not matter which OLAP or server implementation is utilized. Although displayed formats may be embellished with implementation specific details, they are essentially based upon multidimensional expression language (e.g. MDX) kernel functions and variable types. Data, on the other hand, may be sourced from any physical persistent system such as a relational database like SQL, from flat files in several formats such as CSV, etc., or from http streams or any other source that can provide raw data to the multidimensional query engine.

Figure 5:
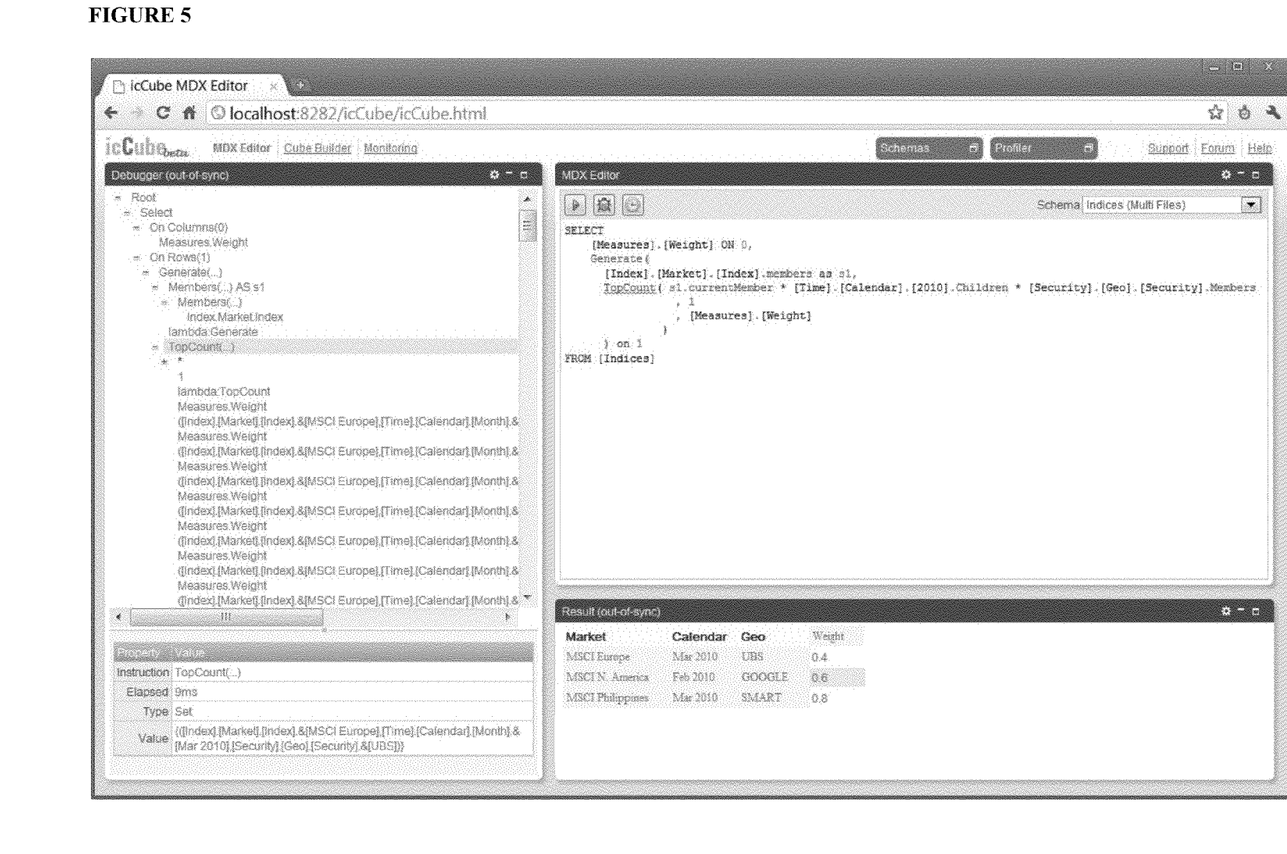
FIG. 5 is a Snapshot of the User Interface or MDX Editor Running an MDX Query.

FIG. 5 shows a snapshot of the User Interface or 'MDX Editor' running an instance or 'MDX Query'. The 'MDX Query' is displayed in the 'Query Editor' window. The result is contained within the 'Pivot Table' window. The 'Debugger' window shows the end user how the MDX query has been transformed into several smaller parts. Selecting each individual part then provides the end user with information instructive to how that part is related to the end result. The model in this specific case traces how a user invoking the TopCount( ) function (selected in the 'Debugger' window and highlighted in the original MDX query in the 'Query Editor' window) impacts the final result. As TopCount( ) is an MDX function which returns a list of items, the system displays these results (in the 'Property/Value' table of the "Debugger" window). With this business information in hand, the end user can now continue his investigation at a higher level of execution; for example, by investigating the Generate( ) function call that uses that TopCount( ) function call and so on . . . .

Example

Troubleshooting: TopCount( ) Function

The example shown for the above described data model and set is to find the month with the highest sales for the continent [America]. The appropriate query is as follows:

```
SELECT
    [Geography].[Geo].[America] on 0,
    TopCount ([Time].[Calendar].[Month].members, 1) on 1
FROM
    [sales]
```

Figure 7:
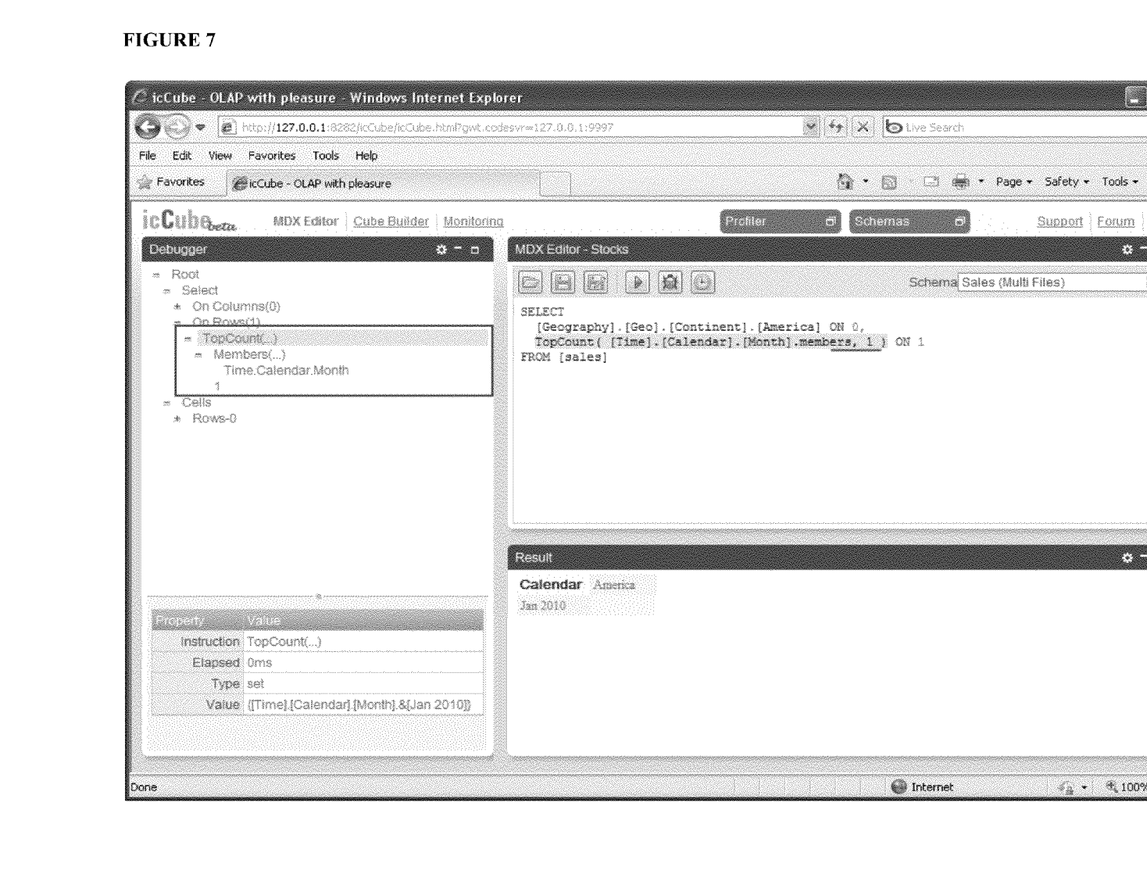
FIG. 7 shows an example undesired evaluation of the TopCount( ) function.

This brings back an empty cell for the month [January 2010]. As this was not expected, the user may use the debugger to check, as displayed in screen FIG. 7. FIG. 7 shows an example evaluation of the TopCount( ) function call evaluating no tuples and returning the first member of the level's members within the Geography hierarchy. As shown in the debugger tree, TopCount( ) method evaluates no tuples and merely returns the first member of the level's members. From the documentation for TopCount( ): it is apparent that when no [Measures] is specified TopCount( ) is equivalent to the Head( ) function. This explains why no tuple has been evaluated, which in turn leads to an unexpected result.

Now the query can be fixed and the [Measure] introduced.

```
SELECT
    [Geography].[Geo].[America] on 0,
    TopCount( [Time].[Calendar].[Month].members, 1,
    [Measures].[Amount]) on 1
FROM
    [sales]
```

Figure 8:
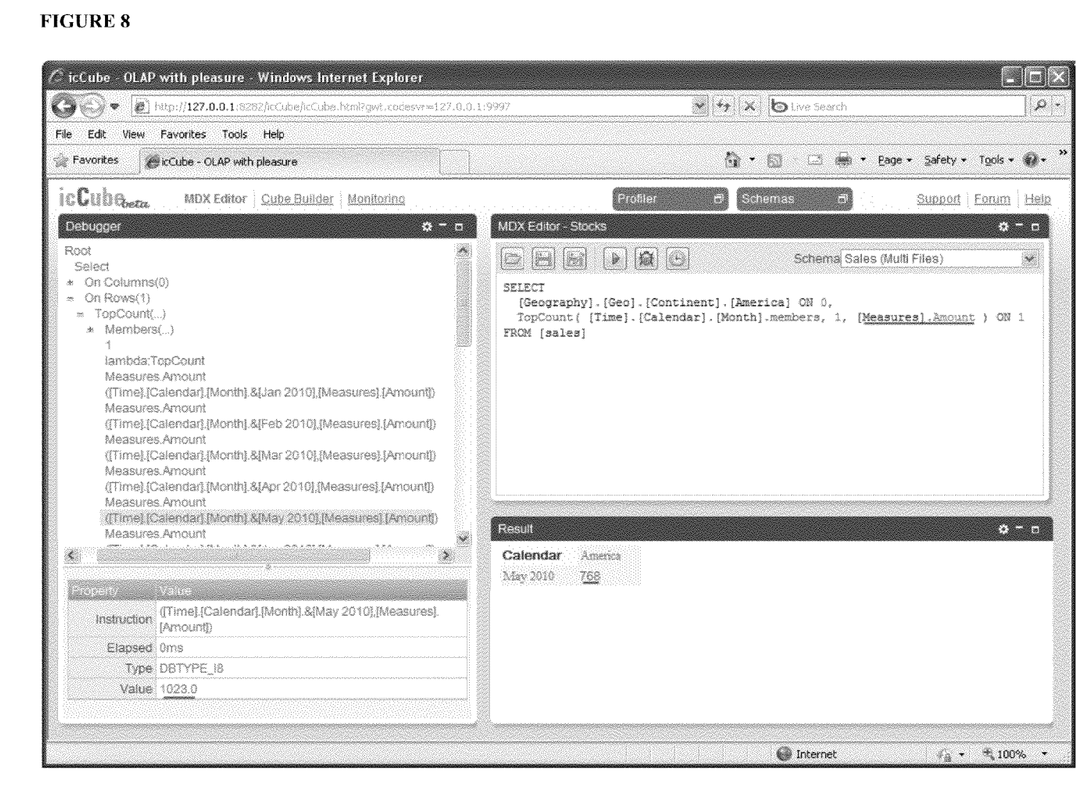
FIG. 8 shows another example of an undesired evaluation of the TopCount( ) function call.

Now, as shown in FIG. 8, the TopCount( ) function call is evaluated differently. FIG. 8 is the evaluation of the TopCount( ) function call evaluating all tuples within the Geography hierarchy. All tuples can now be evaluated to select the top month. The tuple value calculated within the TopCount evaluation is 1023, which is not the same result shown in the pivot table result. Why? TopCount( ) is evaluated when computing the rows axis and therefore not within the context of the selected member in the columns ([America]). Therefore, TopCount( ) operates on the default of the [Geography].[Geo] hierarchy which is the [All] member.

To confirm the cell computation, the tuple value may be verified. [May 2010] is used as the result of the TopCount( ) evaluation; [America] is selected on the columns axis.

Figure 9:
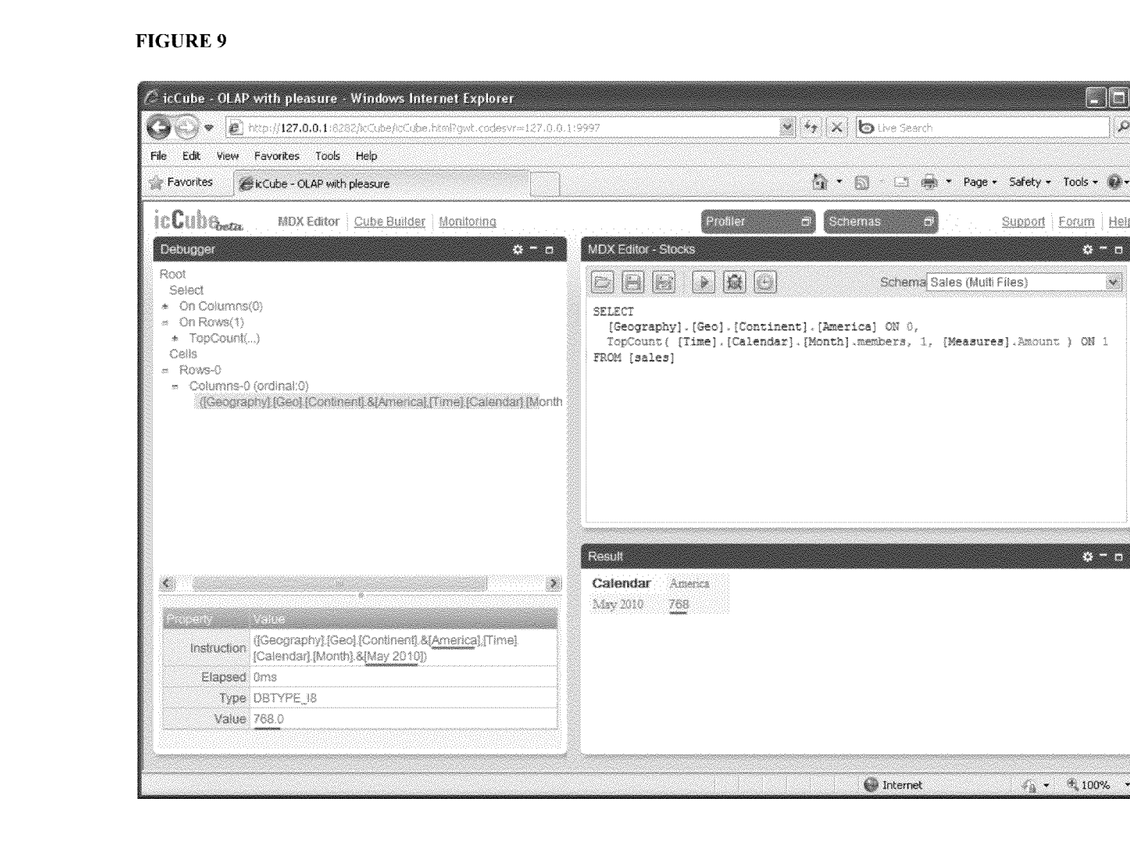
FIG. 9 shows the desired evaluation of the TopCount( ) function.

This still does not match the initial request, so it is not certain to yield top sales months for [America]. In order to get the desired result finally, the following MDX request is required, as shown in FIG. 9, with the evaluation of the TopCount( ) function call to yield the desired result of the top sales months for the [America] level within the Geography hierarchy:

```
SELECT
    [Geography].[Geo].[America] on 0,
    TopCount([Time].[Calendar].[Month].members, 1,
        ([Geography].[Geo].[America],[Measures].[Amount])) on 1
FROM
    [sales]
```

It is important to note that the present invention is not restricted to the graphical user interface described in FIG. 5, but may use any kind of user-friendly human interface (e.g., graphical interface, text interface, or XML format). Nor is the system limited to any narrow specific representation or implementation of 'MDX Part' or 'MDX Part Info'. They can, for example, be shown graphically and processed to yield various formats of reports.

Figure 6:
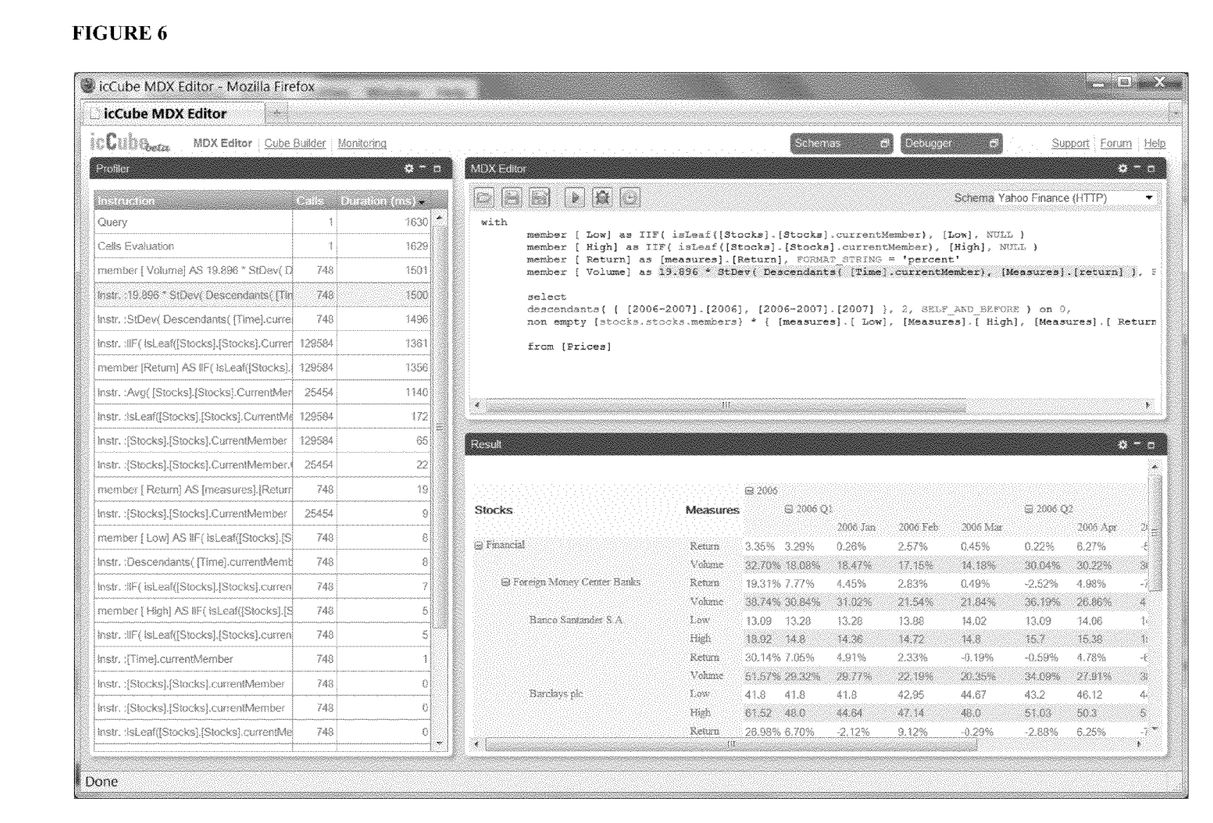
FIG. 6 is a Snapshot of the Profiler/Debugger Displaying Query Pertinent Information.

FIG. 6 shows the example of a profiler displaying 'MDX Part Info' in a tabular format, tracking the elapsed time (duration) for execution. Again, this example merely proposes one possible presentation of a solution of the underlying problem. However, several other formats may be used to display the information, e.g., trees, graphs from the query editor 'MDX Editor' or the query result 'MDX Result'; or merely linking the result of the query back to the query itself. It is important, therefore not to lose sight of the fact that the program flows and specified herein are merely exemplary and illustrative in nature, and in no way a limiting definition of the current invention. Any multidimensional query language may be substituted and implemented in place of XMLA definitions or MDX, and the server need not be restricted to OLAP.

What is claimed is:

1. A debugger component of a data processing system for a multidimensional database structure on a computer architecture that facilitates interactive development, analysis, understanding and debugging of Multi-Dimensional expression (MDX) query processing operations on a multidimensional database comprising:
   a primary central or distributed processing component, wherein said primary central component comprises a CPU;
   a data storage component, wherein the data storage component is a Multidimensional OnLine Analytical Processing Server (MOLAP),
   comprising one or more physical computer-readable media units operatively coupled to the primary central processing component, and which physically stores both the multidimensional database and a plurality of computer executable instructions;

wherein the computer executable instructions operate on the primary central or distributed processing component to achieve the following system debugging system components:

an input component, comprising a visual terminal, for multidimensional database queries to be entered by an end user;

an analysis component, analyzing the multidimensional database queries entered by the end user which operates to break down a parent query into constituent parts and then associates each constituent part with contextual information pertaining to it, wherein said constituent parts comprise query segments and said contextual information comprises the value or content assigned in computing said query segment;

a linking component which links each constituent part of the parent query and its associated information with the parent query as well as with the end-result of that parent query operating on the multidimensional database; and a display component which converts the information about each constituent part, its associated information, linked parent query and linked end-result into various intermediate display-formatted results for an end-user, then displays these display-formatted results to that end-user, wherein said intermediate display-formatted results do not comprise raw data.

2. The debugger component of the data processing system of claim 1, wherein the query is in a language that follows the XMLA standard.

3. The debugger component of the data processing system of claim 1, wherein the multidimensional database is sourced from a physical persistent system.

4. The debugger component of the data processing system of claim 3, wherein the physical persistent system is a relational database.

5. The debugger component of the data processing system of claim 3, wherein the physical persistent system is a flat file.

6. The debugger component of the data processing system of claim 3, wherein the physical persistent system is an HTTP stream.

7. The debugger component of the data processing system of claim 3, wherein the physical persistent system is a memory system.

8. The debugger component of the data processing system of claim 1, wherein the input component, as well as the intermediate display-formatted results are shown in a specific human understandable format.

9. The debugger component of the data processing system of claim 1, wherein the intermediate display-formatted results take the form of a Pivot Table.

10. A debugging method for a multidimensional database structure in a data processing system within a computer architecture that facilitates interactive development, analysis, understanding and debugging of a Multi-Dimensional expression query processing operations on a multidimensional database comprising the steps of:

a) physically storing the multidimensional database and a plurality of computer executable instructions on a data storage means comprising a Multidimensional OnLine Analytical Processing (MOLAP) Server, and comprising one or more computer-readable media units b) causing the computer executable instructions to operate on a primary central or distributed processing means, wherein said primary central processing means comprises a CPU operatively coupled to the data storage means in order to achieve the following system debugging system steps:

c) accepting input from an end user by input means, the input being in the form of queries that operate on a multidimensional database, wherein said database is made of MOLAP cubes;

d) analyzing the multidimensional database queries entered by the end user by:

i) breaking down parent queries into constituent parts and then ii) associating each constituent part with its pertinent contextual information, wherein said constituent parts comprise query segments and said contextual information comprises the value or content assigned in computing said query segment;

linking each constituent part of the parent query and its associated information with the parent query as well as with the end-result of that parent query operating on the multidimensional database a component which links;

converting the information about each of the constituent query parts, along with its associated pertinent information, linked parent query and linked end-result into various intermediate display-formatted results for easy visibility to an end-user; and displaying these display-formatted results to that end-user, wherein said intermediate display formatted results do not comprise raw data.

11. The debugging method of claim 10, wherein the query is in a language that follows the XMLA standard.

12. The debugging method of claim 10, wherein the multidimensional database is sourced from a physical persistent system.

13. The debugging method of claim 12, wherein the physical persistent system is a relational database.

14. The debugging method of claim 12, wherein the physical persistent system is a flat file.

15. The debugging method of claim 12, wherein the physical persistent system is an HTTP stream.

16. The debugging method of claim 12, wherein the physical persistent system is a memory system.

17. The debugging method of claim 10, wherein the input component, as well as the intermediate display-formatted results are shown in a specific human understandable format.

18. The debugging method of claim 10, wherein the intermediate display-formatted results take the form of a Pivot Table.

* * * * *